(12) United States Patent
Shepelev et al.

(10) Patent No.: US 9,939,972 B2
(45) Date of Patent: Apr. 10, 2018

(54) MATRIX SENSOR WITH VIA ROUTING

(71) Applicant: SYNAPTICS INCORPORATED, San Jose, CA (US)

(72) Inventors: Petr Shepelev, Campbell, CA (US); Joseph Kurth Reynolds, Alviso, CA (US); David Hinterberger, Rochester, NY (US); Thomas Mackin, Rochester, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 14/788,623

(22) Filed: Jun. 30, 2015

(65) Prior Publication Data

US 2016/0291721 A1    Oct. 6, 2016

Related U.S. Application Data

(60) Provisional application No. 62/143,446, filed on Apr. 6, 2015.

(51) Int. Cl.
*G06F 3/044* (2006.01)
*G02F 1/1345* (2006.01)

(52) U.S. Cl.
CPC ............ *G06F 3/044* (2013.01); *G02F 1/1345* (2013.01); *G06F 2203/04111* (2013.01)

(58) Field of Classification Search
CPC ...... G06F 3/044; G06F 3/0412; G06F 3/0416; G06F 2203/04103; G02F 1/13338
See application file for complete search history.

(56) References Cited

U.S. PATENT DOCUMENTS 4,087,625 A    5/1978    Dym et al.
4,233,522 A    11/1980   Grummer et al.
(Continued)

FOREIGN PATENT DOCUMENTS

CN    2436978 Y    6/2001
CN    1490713 A    4/2004
(Continued)

OTHER PUBLICATIONS

International Search Report; PCT/US2013/021314 dated Jun. 25, 2013.

(Continued)

*Primary Examiner* — Sanjiv D Patel
(74) *Attorney, Agent, or Firm* — Paradice & Li LLP

(57) ABSTRACT

Disclosed herein include an input device, processing system and methods for touch sensing. In one embodiment, an input device is provided that includes a plurality of sensing elements arranged in a sensor pattern and a plurality of conductive routing traces. Each conductive routing trace is conductively paired with a respective one of the plurality of sensing elements. The sensor routing traces are configured to reduce an RC load of the corresponding paired sensing elements compared to a base RC load of a plurality of base electrodes arranged in a base pattern that is identical to the sensor pattern. Each base sensor electrode is conductively paired with a base routing trace. The base sensor electrode and paired base routing trace have a size that is identical to a size of the paired sensing elements and conductive routing trace. The base routing trace terminates at the base sensor electrode to which the base routing trace is paired.

19 Claims, 7 Drawing Sheets

(56) References Cited

U.S. PATENT DOCUMENTS

| | | |
|---|---|---|
| 4,237,421 A | 12/1980 | Waldron |
| 4,264,903 A | 4/1981 | Bigelow |
| 4,293,987 A | 10/1981 | Gottbreht et al. |
| 4,484,026 A | 11/1984 | Thornburg |
| 4,492,958 A | 1/1985 | Minami |
| 4,550,221 A | 10/1985 | Mabusth |
| 4,550,310 A | 10/1985 | Yamaguchi et al. |
| 4,659,874 A | 4/1987 | Landmeier |
| 4,667,259 A | 5/1987 | Uchida et al. |
| 4,677,259 A | 6/1987 | Abe |
| 4,705,919 A | 11/1987 | Dhawan |
| 4,771,138 A | 9/1988 | Dhawan |
| 4,878,013 A | 10/1989 | Andermo |
| 4,954,823 A | 9/1990 | Binstead |
| 4,999,462 A | 3/1991 | Purcell |
| 5,053,715 A | 10/1991 | Andermo |
| 5,062,916 A | 11/1991 | Aufderheide et al. |
| 5,239,307 A | 8/1993 | Andermo |
| 5,341,233 A | 8/1994 | Tomoike et al. |
| 5,459,463 A | 10/1995 | Gruaz et al. |
| 5,463,388 A | 10/1995 | Boie et al. |
| 5,650,597 A | 7/1997 | Redmayne |
| 5,657,012 A | 8/1997 | Tait |
| 5,777,596 A | 7/1998 | Herbert |
| 5,796,183 A | 8/1998 | Hourmand |
| 5,841,078 A | 11/1998 | Miller et al. |
| 5,869,790 A | 2/1999 | Shigetaka et al. |
| 6,054,979 A | 4/2000 | Sellers |
| 6,188,391 B1 | 2/2001 | Seely et al. |
| 6,222,522 B1 | 4/2001 | Mathews et al. |
| 6,256,022 B1 | 7/2001 | Manaresi et al. |
| 6,281,888 B1 | 8/2001 | Hoffman et al. |
| 6,288,707 B1 | 9/2001 | Philipp |
| 6,297,811 B1 | 10/2001 | Kent et al. |
| 6,307,751 B1 | 10/2001 | Bodony et al. |
| 6,320,394 B1 | 11/2001 | Tartagni |
| 6,362,633 B1 | 3/2002 | Tartagni |
| 6,380,930 B1 | 4/2002 | Van Ruymbeke |
| 6,452,514 B1 | 9/2002 | Philipp |
| 6,459,044 B2 | 10/2002 | Watanabe et al. |
| 6,486,862 B1 | 11/2002 | Jacobsen et al. |
| 6,512,381 B2 | 1/2003 | Kramer |
| 6,535,200 B2 | 3/2003 | Philipp |
| 6,583,632 B2 | 6/2003 | Von Basse et al. |
| 6,653,736 B2 | 11/2003 | Kishimoto et al. |
| 6,731,120 B2 | 5/2004 | Tartagni |
| 6,771,327 B2 | 8/2004 | Sekiguchi |
| 6,825,833 B2 | 11/2004 | Mulligan et al. |
| 6,879,930 B2 | 4/2005 | Sinclair et al. |
| 6,910,634 B1 | 6/2005 | Inose et al. |
| 6,937,031 B2 | 8/2005 | Yoshioka et al. |
| 6,998,855 B2 | 2/2006 | Tartagni |
| 7,129,935 B2 | 10/2006 | Mackey |
| 7,158,125 B2 | 1/2007 | Sinclair et al. |
| 7,218,314 B2 | 5/2007 | Itoh |
| 7,306,144 B2 | 12/2007 | Moore |
| 7,327,352 B2 | 2/2008 | Keefer et al. |
| 7,339,579 B2 | 3/2008 | Richter et al. |
| 7,348,967 B2 | 3/2008 | Zadesky et al. |
| 7,382,139 B2 | 6/2008 | Mackey |
| 7,388,571 B2 | 6/2008 | Lowles et al. |
| 7,423,219 B2 | 9/2008 | Kawaguchi et al. |
| 7,423,635 B2 | 9/2008 | Taylor et al. |
| 7,439,962 B2 | 10/2008 | Reynolds et al. |
| 7,455,529 B2 | 11/2008 | Fujii et al. |
| 7,522,230 B2 | 4/2009 | Lee |
| 7,548,073 B2 | 6/2009 | Mackey et al. |
| 7,554,531 B2 | 6/2009 | Baker et al. |
| 7,589,713 B2 | 9/2009 | Sato |
| 7,663,607 B2 | 2/2010 | Hotelling et al. |
| 7,724,243 B2 | 5/2010 | Geaghan |
| 7,768,273 B1 | 8/2010 | Kalnitsky et al. |
| 7,786,981 B2 | 8/2010 | Proctor |
| 7,808,255 B2 | 10/2010 | Hristov et al. |
| 7,812,825 B2 | 10/2010 | Sinclair et al. |
| 7,821,274 B2 | 10/2010 | Philipp et al. |
| 7,821,502 B2 | 10/2010 | Hristov |
| 7,859,521 B2 | 12/2010 | Hotelling et al. |
| 7,864,160 B2 | 1/2011 | Geaghan et al. |
| 7,876,309 B2 | 1/2011 | XiaoPing |
| 7,973,771 B2 | 7/2011 | Geaghan |
| 7,977,953 B2 | 7/2011 | Lee |
| 7,986,152 B2 | 7/2011 | Philipp et al. |
| 8,040,326 B2 | 10/2011 | Hotelling et al. |
| 8,059,015 B2 | 11/2011 | Hua et al. |
| 8,125,463 B2 | 2/2012 | Hotelling et al. |
| 8,243,027 B2 | 8/2012 | Hotelling et al. |
| 8,258,986 B2 | 9/2012 | Makovetskyy |
| 8,259,078 B2 | 9/2012 | Hotelling et al. |
| 8,278,571 B2 | 10/2012 | Orsley |
| 8,305,359 B2 | 11/2012 | Bolender et al. |
| 8,319,747 B2 | 11/2012 | Hotelling et al. |
| 8,743,087 B2 | 6/2014 | Hotelling et al. |
| 8,970,524 B2 | 3/2015 | Kim et al. |
| 8,994,673 B2 | 3/2015 | Hwang et al. |
| 9,024,913 B1 | 5/2015 | Jung et al. |
| 9,052,766 B2 * | 6/2015 | Dunphy ............... G06F 3/0412 |
| 9,317,152 B2 * | 4/2016 | Pyo ....................... G06F 3/0412 |
| 9,329,424 B2 * | 5/2016 | Chae .................... G02F 1/13338 |
| 2002/0077313 A1 | 6/2002 | Clayman |
| 2003/0052867 A1 | 3/2003 | Shigetaka et al. |
| 2003/0103043 A1 | 6/2003 | Mulligan et al. |
| 2003/0234771 A1 | 12/2003 | Mulligan et al. |
| 2004/0062012 A1 | 4/2004 | Murohara |
| 2004/0077313 A1 | 4/2004 | Oba et al. |
| 2004/0125087 A1 | 7/2004 | Taylor et al. |
| 2004/0222974 A1 | 11/2004 | Hong et al. |
| 2004/0239650 A1 | 12/2004 | Mackey |
| 2004/0252109 A1 | 12/2004 | Trent et al. |
| 2005/0030048 A1 | 2/2005 | Bolender et al. |
| 2006/0038754 A1 | 2/2006 | Kim |
| 2006/0097991 A1 | 5/2006 | Hotelling et al. |
| 2006/0114240 A1 | 6/2006 | Lin |
| 2006/0114241 A1 | 6/2006 | Lin |
| 2006/0232600 A1 | 10/2006 | Kimura et al. |
| 2007/0008299 A1 | 1/2007 | Hristov |
| 2007/0222762 A1 | 9/2007 | Van Delden et al. |
| 2007/0229466 A1 | 10/2007 | Peng et al. |
| 2007/0229468 A1 | 10/2007 | Peng et al. |
| 2007/0229469 A1 | 10/2007 | Seguine |
| 2007/0229470 A1 | 10/2007 | Snyder et al. |
| 2007/0242054 A1 | 10/2007 | Chang et al. |
| 2007/0257894 A1 | 11/2007 | Philipp |
| 2007/0262962 A1 | 11/2007 | XiaoPing et al. |
| 2007/0262963 A1 | 11/2007 | Xiao-Ping et al. |
| 2007/0268265 A1 | 11/2007 | XiaoPing |
| 2007/0273659 A1 | 11/2007 | XiaoPing et al. |
| 2007/0273660 A1 | 11/2007 | XiaoPing |
| 2007/0279395 A1 | 12/2007 | Philipp et al. |
| 2007/0291009 A1 | 12/2007 | Wright et al. |
| 2008/0006453 A1 | 1/2008 | Hotelling |
| 2008/0007534 A1 | 1/2008 | Peng et al. |
| 2008/0062140 A1 | 3/2008 | Hotelling et al. |
| 2008/0062147 A1 | 3/2008 | Hotelling et al. |
| 2008/0074398 A1 | 3/2008 | Wright |
| 2008/0111795 A1 | 5/2008 | Bollinger |
| 2008/0117182 A1 | 5/2008 | Um et al. |
| 2008/0150906 A1 | 6/2008 | Grivna |
| 2008/0158172 A1 | 7/2008 | Hotelling et al. |
| 2008/0158181 A1 | 7/2008 | Hamblin et al. |
| 2008/0164076 A1 | 7/2008 | Orsley |
| 2008/0218488 A1 | 9/2008 | Yang et al. |
| 2008/0245582 A1 | 10/2008 | Bytheway |
| 2008/0246723 A1 | 10/2008 | Baumbach |
| 2008/0259044 A1 | 10/2008 | Utsunomiya et al. |
| 2008/0264699 A1 | 10/2008 | Chang et al. |
| 2008/0265914 A1 | 10/2008 | Matsushima |
| 2008/0297176 A1 | 12/2008 | Douglas |
| 2008/0308323 A1 | 12/2008 | Huang et al. |
| 2008/0309635 A1 | 12/2008 | Matsuo |
| 2009/0002337 A1 | 1/2009 | Chang |
| 2009/0002338 A1 | 1/2009 | Kinoshita et al. |
| 2009/0040191 A1 | 2/2009 | Tong et al. |
| 2009/0046077 A1 | 2/2009 | Tanaka et al. |

(56) References Cited

U.S. PATENT DOCUMENTS

| | | |
|---|---|---|
| 2009/0091551 A1 | 4/2009 | Hotelling et al. |
| 2009/0096757 A1 | 4/2009 | Hotelling et al. |
| 2009/0107737 A1 | 4/2009 | Reynolds et al. |
| 2009/0128518 A1 | 5/2009 | Kinoshita et al. |
| 2009/0135151 A1 | 5/2009 | Sun |
| 2009/0153509 A1 | 6/2009 | Jiang et al. |
| 2009/0160682 A1 | 6/2009 | Bolender et al. |
| 2009/0185100 A1 | 7/2009 | Matsuhira et al. |
| 2009/0201267 A1 | 8/2009 | Akimoto et al. |
| 2009/0207154 A1 | 8/2009 | Chino |
| 2009/0213082 A1 | 8/2009 | Ku |
| 2009/0213534 A1 | 8/2009 | Sakai |
| 2009/0236151 A1 | 9/2009 | Yeh et al. |
| 2009/0262096 A1 | 10/2009 | Teramoto |
| 2009/0267916 A1 | 10/2009 | Hotelling |
| 2009/0273571 A1 | 11/2009 | Bowens |
| 2009/0273573 A1 | 11/2009 | Hotelling |
| 2009/0277695 A1 | 11/2009 | Liu et al. |
| 2009/0283340 A1 | 11/2009 | Liu et al. |
| 2009/0303203 A1 | 12/2009 | Yilmaz et al. |
| 2009/0309850 A1 | 12/2009 | Yang |
| 2009/0314621 A1 | 12/2009 | Hotelling |
| 2009/0324621 A1 | 12/2009 | Senter et al. |
| 2010/0001966 A1 | 1/2010 | Lii et al. |
| 2010/0001973 A1 | 1/2010 | Hotelling et al. |
| 2010/0006347 A1 | 1/2010 | Yang |
| 2010/0013745 A1 | 1/2010 | Kim et al. |
| 2010/0013800 A1 | 1/2010 | Elias et al. |
| 2010/0044122 A1 | 2/2010 | Sleeman et al. |
| 2010/0090979 A1 | 4/2010 | Bae |
| 2010/0134422 A1 | 6/2010 | Borras |
| 2010/0140359 A1 | 6/2010 | Hamm et al. |
| 2010/0144391 A1 | 6/2010 | Chang et al. |
| 2010/0147600 A1 | 6/2010 | Orsley |
| 2010/0149108 A1 | 6/2010 | Hotelling et al. |
| 2010/0156839 A1 | 6/2010 | Ellis |
| 2010/0163394 A1 | 7/2010 | Tang et al. |
| 2010/0182273 A1 | 7/2010 | Noguchi et al. |
| 2010/0188359 A1 | 7/2010 | Lee |
| 2010/0193257 A1 | 8/2010 | Hotelling et al. |
| 2010/0194695 A1 | 8/2010 | Hotelling et al. |
| 2010/0194697 A1 | 8/2010 | Hotelling et al. |
| 2010/0214247 A1 | 8/2010 | Tang et al. |
| 2010/0220075 A1 | 9/2010 | Kuo et al. |
| 2010/0258360 A1 | 10/2010 | Yilmaz |
| 2010/0265210 A1 | 10/2010 | Nakanishi et al. |
| 2010/0271330 A1 | 10/2010 | Philipp |
| 2010/0277433 A1 | 11/2010 | Lee et al. |
| 2010/0289770 A1 | 11/2010 | Lee et al. |
| 2010/0291973 A1 | 11/2010 | Nakahara et al. |
| 2010/0302201 A1 | 12/2010 | Ritter et al. |
| 2010/0321043 A1 | 12/2010 | Philipp et al. |
| 2010/0321326 A1 | 12/2010 | Grunthaner et al. |
| 2011/0006999 A1 | 1/2011 | Chang et al. |
| 2011/0007030 A1 | 1/2011 | Mo et al. |
| 2011/0018841 A1 | 1/2011 | Hristov |
| 2011/0022351 A1 | 1/2011 | Philipp et al. |
| 2011/0025635 A1 | 2/2011 | Lee |
| 2011/0025639 A1 | 2/2011 | Trend et al. |
| 2011/0048812 A1 | 3/2011 | Yilmaz |
| 2011/0048813 A1 | 3/2011 | Yilmaz |
| 2011/0057887 A1 | 3/2011 | Lin et al. |
| 2011/0062969 A1 | 3/2011 | Hargreaves et al. |
| 2011/0062971 A1 | 3/2011 | Badaye |
| 2011/0063251 A1 | 3/2011 | Geaghan et al. |
| 2011/0080357 A1 | 4/2011 | Park et al. |
| 2011/0090159 A1 | 4/2011 | Kurashima |
| 2011/0096016 A1 | 4/2011 | Yilmaz |
| 2011/0109579 A1 | 5/2011 | Wang et al. |
| 2011/0109590 A1 | 5/2011 | Park |
| 2011/0141051 A1 | 6/2011 | Ryu |
| 2011/0169770 A1 | 7/2011 | Mishina et al. |
| 2011/0187666 A1 | 8/2011 | Min |
| 2011/0242444 A1 | 10/2011 | Song |
| 2011/0248949 A1 | 10/2011 | Chang et al. |
| 2011/0267300 A1 | 11/2011 | Serban et al. |
| 2011/0273391 A1 | 11/2011 | Bae |
| 2011/0298746 A1 | 12/2011 | Hotelling |
| 2011/0304564 A1 | 12/2011 | Kim et al. |
| 2012/0038585 A1 | 2/2012 | Kim |
| 2012/0044171 A1 | 2/2012 | Lee et al. |
| 2012/0056820 A1 | 3/2012 | Corbridge |
| 2012/0075214 A1 | 3/2012 | Kim |
| 2012/0218199 A1* | 8/2012 | Kim .......... G06F 3/0412 345/173 |
| 2012/0313901 A1 | 12/2012 | Monson |
| 2013/0057507 A1 | 3/2013 | Shin et al. |
| 2013/0088372 A1 | 4/2013 | Lundstrum et al. |
| 2013/0113695 A1 | 5/2013 | Tseng et al. |
| 2013/0162570 A1 | 6/2013 | Shin et al. |
| 2013/0215075 A1 | 8/2013 | Lee et al. |
| 2013/0257794 A1* | 10/2013 | Lee .......... G06F 3/041 345/174 |
| 2013/0321296 A1 | 12/2013 | Lee et al. |
| 2014/0043281 A1 | 2/2014 | Kim et al. |
| 2014/0118277 A1* | 5/2014 | Kim .......... G06F 3/044 345/173 |
| 2014/0132525 A1 | 5/2014 | Pyo et al. |
| 2014/0132526 A1 | 5/2014 | Lee et al. |
| 2014/0132534 A1 | 5/2014 | Kim |
| 2014/0132559 A1 | 5/2014 | Kim |
| 2014/0139761 A1* | 5/2014 | Yanagawa .......... G06F 3/044 349/12 |
| 2014/0267145 A1 | 9/2014 | Shepelev |
| 2015/0042600 A1* | 2/2015 | Lukanc .......... G06F 3/0412 345/174 |
| 2015/0042601 A1* | 2/2015 | Lee .......... G06F 3/044 345/174 |
| 2015/0123933 A1* | 5/2015 | Jang .......... G06F 3/044 345/174 |
| 2015/0130753 A1* | 5/2015 | Woo .......... G06F 3/044 345/174 |
| 2015/0138173 A1 | 5/2015 | Bae et al. |
| 2016/0026291 A1* | 1/2016 | Zhao .......... G06F 3/044 345/174 |

FOREIGN PATENT DOCUMENTS

| | | |
|---|---|---|
| EP | 0810540 A2 | 12/1997 |
| EP | 0919945 A2 | 6/1999 |
| EP | 0977159 A1 | 2/2000 |
| JP | 2002-215330 A | 8/2002 |
| JP | 2002-268768 A | 9/2002 |
| JP | 2002268786 A | 9/2002 |
| JP | 2011002947 A | 1/2011 |
| JP | 2011002948 A | 1/2011 |
| JP | 2011002949 A | 1/2011 |
| JP | 2011002950 A | 1/2011 |
| JP | 2011004076 A | 1/2011 |
| JP | 2011100379 A | 5/2011 |
| KR | 10110118065 | 1/2012 |
| WO | WO-86/06551 A1 | 11/1986 |
| WO | WO-0057344 A1 | 9/2000 |
| WO | WO-2010117946 A2 | 10/2010 |
| WO | WO-20100136932 A1 | 12/2010 |

OTHER PUBLICATIONS

Quantum Research Group. "Qmatrix Technology White Paper", 2006. 4 Pages.

Lubart, et al. "One Layer Optically Transparent Keyboard for Input Display", IP.com. Mar. 1, 1979. 3 Pages.

Gary L. Barrett et al. "Projected Capacitive Touch Screens", iTouchInternational. 9 pages.

Quantum Research Application Note An-KD01. "Qmatrix Panel Design Guidelines", Oct. 10, 2002. 4 Pages.

Calvin Wang et al. "Single Side All-Point-Addressable Clear Glass Substrate Sensor Design", IP.com. Apr. 2, 2009. 3 Pages.

Tsz-Kin Ho et al. "32.3: Simple Single-Layer Multi-Touch Projected Capacitive Touch Panel", SID 09 Digest.

Johannes Schoning et al. "Multi-Touch Surfaces: A Technical Guide", Technical Report TUM-I0833. 2008.

(56) References Cited

OTHER PUBLICATIONS

Shawn Day. "Low Cost Touch Sensor on the Underside of a Casing", IP.com. Oct. 14, 2004.
Ken Gilleo. "The Circuit Centennial", 16 Pages.
Ken Gilleo, "The Definitive History of the Printed Circuit", 1999 PC Fab.
Hal Philipp. "Charge Transfer Sensing", vol. 19, No. 2. 1999. pp. 96-105.
Paul Leopardi, "A Partition of the Unit Sphere into Regions of Equal Area and Small Diameter", 2005.
Olivier Bau, "TeslaTouch: Electrovibration for Touch Surfaces", 2010.
Colin Holland. "SID: Single Layer Technology Boosts Capacitive Touchscreens", www.eetimes.com/General. 2011.
"Novel Single Layer Touchscreen Based on Indium", 2011.
"Mesh Patterns for Capacitive Touch or Proximity Sensors", IP.com. May 14, 2010. 3pages.
"IDT Claims World's First True Single-Layer Multi-Touch Projected Capacitive Touch Screen Technology", EE Times Europe. Dec. 8, 2010.
Tracy V. Wilson et al. "How the iPhone Works", HowStuffWorks "Multi-touch Systems". 2011.
Sunkook Kim et al. "A Highly Sensitive Capacitive Touch Sensor Integrated on a Thin-Film-Encapsulated Active-Matrix OLED for Ultrathin Displays", IEEE Transactions on Electron Devices, vol. 58, No. 10, Oct. 2011.
Mike Williams, "Dream Screens from Graphene", Technology Developed at Rice could Revolutionize Touch-Screen Displays. Aug. 2011.
ASIC Packaging Guidebook, Toshiba Corporation. (2000). 35 pages.
Fujitsu Microelectronics Limited. "IC Package." (2002). 10 pages.
International Search Report, PCT/US2013/021314 dated Jun. 25, 2013.

* cited by examiner

MATRIX SENSOR WITH VIA ROUTING

CROSS-REFERENCE TO RELATED APPLICATION

This application claims benefit of U.S. Provisional Patent Application Ser. No. 62/143,446, filed on Apr. 6, 2015, and titled ROUTING TECHNIQUES FOR AN DISPLAY DEVICE COMPRISING AN INTEGRATED SENSING DEVICE, which is incorporated by reference in its entirety.

BACKGROUND OF THE INVENTION

Field of the Invention

Embodiments of the present invention generally relate to a method and apparatus for touch sensing, and more specifically, a capacitive touch sensing device having grid electrodes for improved absolute sensing, and methods for using the same.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Many proximity sensor devices utilize an array of sensor electrodes to measure a change in capacitance indicative of the presence of an input object, such as a finger or stylus, proximate the sensor electrodes. Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects. Absolute capacitance sensing methods are very effective in detecting the presence of a single input object, even when spaced far from the surface of the proximity sensor device.

Other capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of a resulting signal. A resulting signal may comprise effect(s) corresponding to one or more transmitter signals, and/or to one or more sources of environmental interference (e.g. other electromagnetic signals). Sensor electrodes may be dedicated transmitter electrodes or receiver electrodes, or may be configured to both transmit transmitter signals and receive resulting signals. Transcapacitive sensing methods are very effective in detecting the presence of a multiple input objects in a sensing region and input objects that are in motion. However, transcapacitive sensing methods generally rely on compact electric fields which are not very effective for detecting the presence or approach of objects spaced from the surface of the proximity sensor device.

Thus, there is a need for an improved proximity sensor device.

SUMMARY

Embodiments described herein include disclosed herein include an input device, processing system and methods for touch sensing. In one embodiment, an input device is provided that includes a plurality of sensing elements arranged in a sensor pattern and a plurality of conductive routing traces. Each conductive routing trace is conductively paired with a respective one of the plurality of sensing elements. The sensor routing traces are configured to reduce an RC load of the corresponding paired sensing elements compared to a base RC load of a plurality of base electrodes arranged in a base pattern that is identical to the sensor pattern. Each base sensor electrode is conductively paired with a base routing trace. The base sensor electrode and paired base routing trace have a size that is identical to a size of the paired sensor electrode and conductive routing trace. The base routing trace terminates at the base sensor electrode to which the base routing trace is paired.

In another embodiment, an input device is provided that includes a plurality of sensor electrodes arranged in a matrix array and a processing system configured to detect presence of an input device in a sensing area associated with the matrix array. Each of the plurality of sensor electrodes is coupled by at least one of the conductive routing traces to the processing system. A first conductive routing trace of the plurality of conductive routing traces is coupled to a first sensor electrode of the plurality of sensor electrodes by a plurality of vias.

In another embodiment, an input device is provided that includes a plurality of sensor electrodes arranged in a matrix array adapted to detect presence of an input device in a sensing area associated with the matrix array and a plurality of conductive routing traces having connector end adapted for coupling to a processing system and a terminal end. Each of the plurality of sensor electrodes is coupled by at least one of the conductive routing traces to the processing system. A first conductive routing trace of the plurality of conductive routing traces is coupled to a first sensor electrode of the plurality of sensor electrodes by a plurality of vias.

In another embodiment, an input device a plurality of sensor electrodes arranged in a matrix array configured to detect presence of an input device in a sensing area associated with the matrix array and a plurality of conductive routing traces. The plurality of sensor electrodes includes at least a first sensor electrode, a second sensor electrode and a third sensor electrode that are linearly aligned. Each of the plurality of sensor electrodes is coupled to at least one of the conductive routing traces, wherein the conductive routing traces comprise a first routing trace coupled to the first sensor electrode, a second routing trace coupled to the second sensor electrode, and a third routing trace coupled to the third sensor electrode, the second and third routing traces extending below the first sensor electrode. A first conductive line is arranged coplanar with the conductive routing traces. The first conductive line is aligned with the first routing trace and coupled to the second sensor electrode but not coupled to the first or third sensor electrodes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
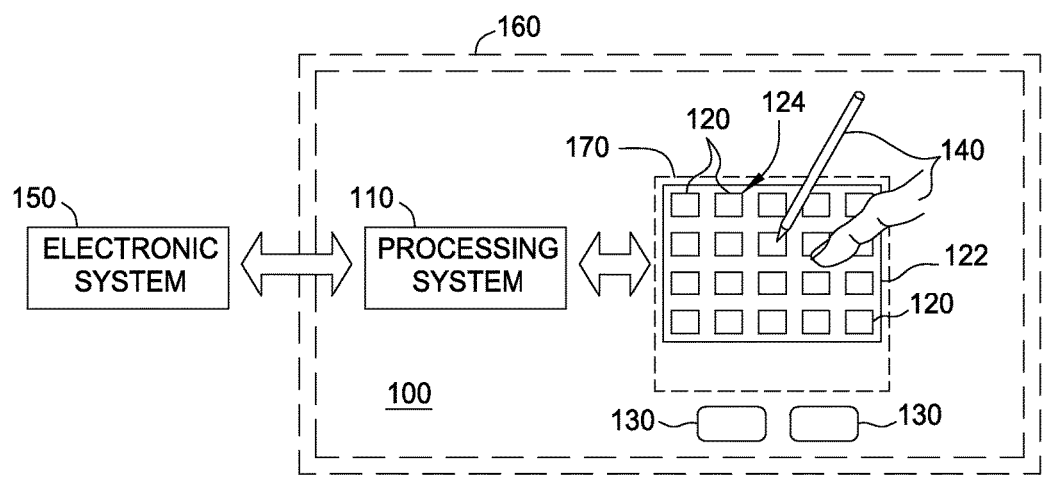
FIG. 1 is a schematic block diagram of an input device.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. Particularly, embodiments described herein advantageously have improved RC load characteristics. The improved RC load characteristics enable reduced power consumption and reduced settling time, along with reduced background capacitance.

FIG. 1 is a schematic block diagram of an input device 100 in accordance with embodiments of the present technology. In one embodiment, input device 100 comprises a display device comprising an integrated sensing device. Although the illustrated embodiments of the present disclosure are shown integrated with a display device, it is contemplated that the invention may be embodied in the input devices that are not integrated with display devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensing elements 124 for detecting user input. The sensing elements 124 include a plurality of sensor electrodes 120, and may optionally include one or more grid electrodes 122. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 124 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 124 to create electric fields. In some capacitive implementations, separate sensing elements 124 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground), and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensor electrodes 120. In various embodiments, an input object 140 near the sensor electrodes 120 alters the electric field between the sensor electrodes 120, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes") as further described below. Transmitter sensor electrodes may be modulated relative to a reference voltage (e.g., system ground) to transmit a transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes 120 may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) 124 of the input device 100. In other embodiments, components of processing system 110 are physically separate with one or more components close to sensing element(s) 124 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) 124 to detect input, identification modules configured to identify gestures such as mode changing gestures, and mode changing modules for changing operation modes.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) 124 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensing elements 124. As another example, the processing system 110 may perform filtering, demodulation or other signal conditioning. In various embodiments, the processing system 110 generates a capacitive image directly from the resulting signals received with sensing elements 124 (sensor electrodes 120). In other embodiments, processing system 110 spatially filters (e.g., taking a difference, weighted sum of neighboring elements) the resulting signals received with sensing elements 124 (or sensor electrodes 120) to generate a sharpened or averaged image. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensing elements 124 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing (e.g., the active matrix control electrodes configured to control the source, gate and/or Vcom voltages). Shared components may include display electrodes, substrates, connectors and/or connections. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
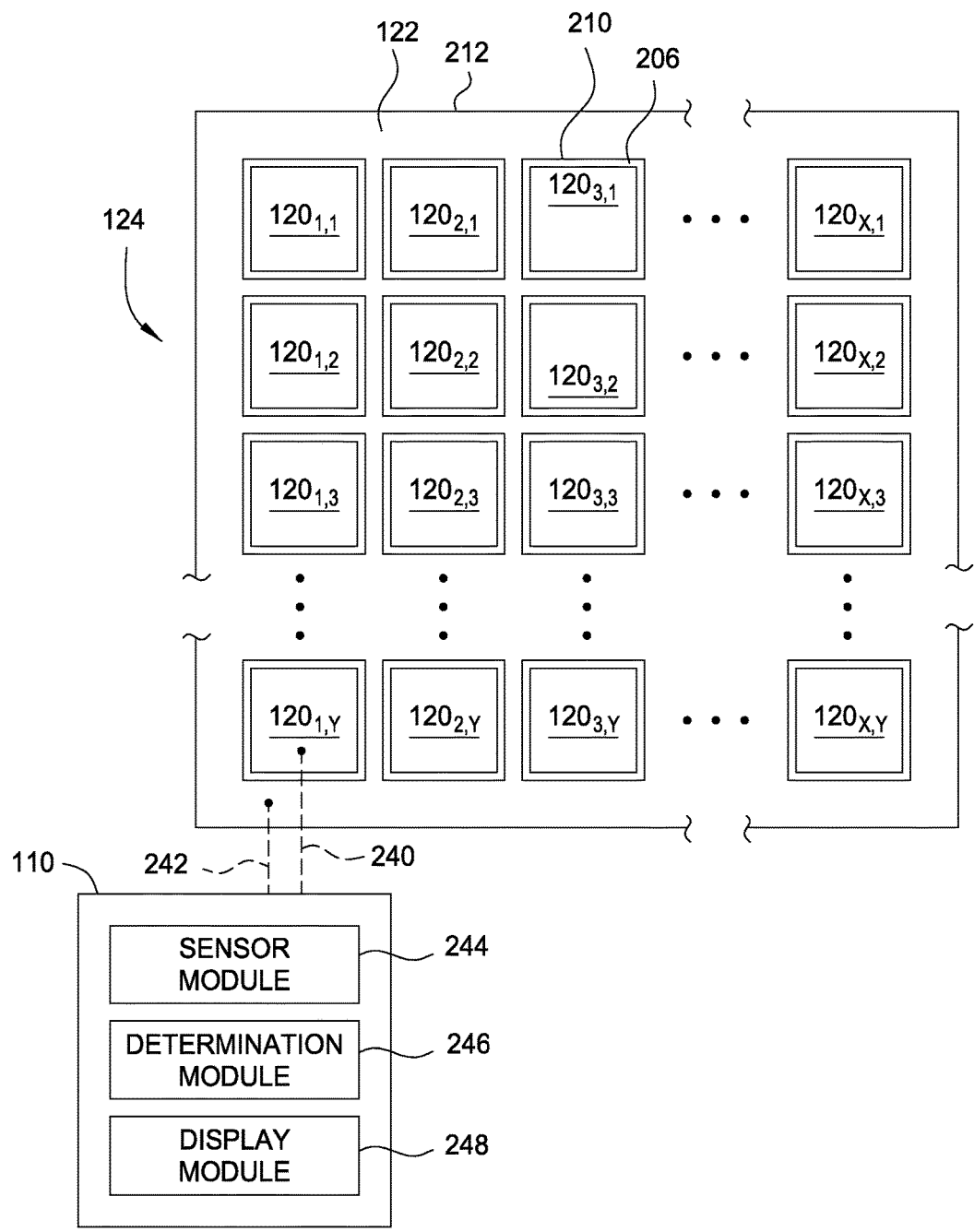
FIG. 2 illustrates a simplified exemplary array of sensor elements that may be used in the input device of FIG. 1.

FIG. 2 shows a portion of an exemplary pattern of sensing elements 124 configured to sense in the sensing region 170 associated with the pattern, according to some embodiments. For clarity of illustration and description, FIG. 2 shows the sensor electrodes 120 of the sensing elements 124 in a pattern of simple rectangles with the grid electrode 222 disposed therebetween, and does not show various other components. The exemplary pattern of sensing elements 124 comprises an array of sensor electrodes $120_{X,Y}$ (referred collectively as sensor electrodes 120) arranged in X columns and Y rows, wherein X and Y are positive integers, although one of X and Y may be zero. It is contemplated that the pattern of sensing elements 124 may comprises a plurality of sensor electrodes 120 having other configurations, such as polar arrays, repeating patters, non-repeating patterns, a single row or column, or other suitable arrangement. Further, in various embodiments the number of sensor electrodes may vary from row to row and/or column to column. In one embodiment, at least one row and/or column of sensor electrodes 120 is offset from the others, such it extends further in at least one direction than the others. The sensor electrodes 120 and grid electrodes 122 are coupled to the processing system 110 and utilized to determine the presence (or lack thereof) of an input object 140 in the sensing region 170.

In a first mode of operation, the arrangement of sensor electrodes 120 (120-1, 120-2, 120-3, . . . 120-n) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

The sensor electrodes 120 are typically ohmically isolated from each other, and also ohmically isolated from the grid electrode 122. That is, one or more insulators separate the sensor electrodes 120 (and grid electrode 122) and prevent them from electrically shorting to each other. In some embodiments, the sensor electrodes 120 and grid electrode 122 are separated by insulative gap 206. The insulative gap 206 separating the sensor electrodes 120 and grid electrode 122 may be filled with an electrically insulating material, or may be an air gap. In some embodiments, the sensor electrodes 120 and the grid electrode 122 are vertically separated by one or more layers of insulative material. In some other embodiments, the sensor electrodes 120 and the grid electrode 122 are separated by one or more substrates; for example, they may be disposed on opposite sides of the same substrate, or on different substrates. In yet other embodiments, the grid electrode 122 may be composed of multiple layers on the same substrate, or on different substrates. In one embodiment, a first grid electrode may be formed on a first substrate or first side of a substrate and a second grid electrode may be formed on a second substrate or a second side of a substrate. For example, a first grid comprises one or more common electrodes disposed on a TFT layer of the display device 160 and a second grid electrode is disposed on the color filter glass of the display device 160. In one embodiment, the dimensions of the first grid electrode are equal to the dimensions of the second grid electrode. In one embodiment, at least one dimension of the first grid electrode differs from a dimension of the second grid electrode. For example, the first grid electrode may be configured such that is disposed between a first and second sensor electrode 120 and the second grid electrode may be configured such that it overlaps at least one of the first and second sensor electrodes 120 and the first grid electrode. Further, the first grid electrode may be configured such that it is disposed between a first and second sensor electrode 120 and the second grid electrode may be configured such that it only overlaps the first grid electrode and is smaller than the first grid electrode.

In a second mode of operation, the sensor electrodes 120 (120-1, 120-2, 120-3, . . . 120-n) may be utilized to detect the presence of an input object via transcapacitive sensing techniques when a transmitter signal is driven onto the grid electrode 122. That is, processing system 110 is configured to drive the grid electrode 122 with a transmitter signal and receive resulting signals with each sensor electrode 120, where a resulting signal comprising effects corresponding to the transmitter signal, which is utilized by the processing system 110 or other processor to determine the position of the input object.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to operate switch between any two or more of the modes described above.

The areas of localized capacitive sensing of capacitive couplings may be termed "capacitive pixels." Capacitive pixels may be formed between an individual sensor electrode 120 and reference voltage in the first mode of operation, between the sensor electrodes 120 and grid electrode 122 in the second mode of operation, and between groups of sensor electrodes 120 used as transmitter and receiver electrodes. The capacitive coupling changes with the proximity and motion of input objects 140 in the sensing region 170 associated with the sensing elements 124, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit a transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes are received with using a scanning scheme.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode with a transmitter or other signal and/or voltage potential. In one embodiment, the switching element may be configured to couple more than one receiver electrode to a common receiver at the same time.

In other embodiments, "scanning" sensor electrodes 120 to determine these capacitive coupling comprises modulating one or more of the sensor electrodes and measuring an absolute capacitance of the one or sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment each of the sensor electrodes 120 are simultaneously driven and received with, obtaining an absolute capacitive measurement simultaneously from each of the sensor electrodes 120. In various embodiments, processing system 110 may configured to selectively modulate a portion of sensor electrodes 120. For example, the sensor electrodes may be selected based on, but not limited to, an application running on the host processor, a status of the input device, and an operating mode of the sensing device. In various embodiments, processing system 110 may be configured to selectively shield at least portion of sensor electrodes 120 and to selectively shield or transmit with the grid electrode(s) 122 while selectively receiving and/or transmitting with other sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a course capacitive image that may not be usable to discern precise positional information. However, a course capacitive image may be used to sense presence of an input object. In one embodiment, the course capacitive image may be used to move processing system 110 or the input device 100 out of a doze or low power mode. In one embodiment, the course capacitive image may be used to move a capacitive sensor integrated circuit out of a doze mode or low power mode. In another embodiment, the course capacitive image may be used to move a host integrated circuit out of a doze mode or low power mode. The course capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between two sensor electrodes, where one sensor electrode is driven with a modulated signal and the other is held stationary relative to system ground or from stray capacitive coupling between a receiver electrode and nearby modulated electrodes. In many embodiment, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the Active Matrix display such as one or more segments of a segmented Vcom electrode (common electrode(s)), a source drive line, gate line, an anode sub-pixel electrode or cathode pixel electrode, or any other display element. These display electrodes may be disposed on an appropriate display screen substrate. For example, the common electrodes may be disposed on the a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode", since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode 122 comprise one or more common electrodes, various other display electrodes as describe above may also be used in conjunction with the common electrode or as an alternative to the common electrodes. In various embodiments, the sensor electrodes 120 and grid electrode 122 comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 2, the processing system 110 coupled to the sensor electrodes 120 includes a sensor module 244 and optionally, a display module 248. The sensor module 244 includes circuitry configured to drive at least one of the sensor electrodes 120 for capacitive sensing during periods in which input sensing is desired. In one embodiment, the sensor module is configured to drive a modulated signal onto the at least one sensor electrode to detect changes in absolute capacitance between the at least one sensor electrode and an input object. In another embodiment, the sensor module is configured to drive a transmitter signal onto the at least one sensor electrode to detect changes in a transcapacitance between the at least one sensor electrode and another sensor electrode. The modulated and transmitter signals are generally varying voltage signals comprising a plurality of voltage transitions over a period of time allocated for input sensing. In various embodiments, the sensor electrodes 120 and/or grid electrode 122 may be driven differently in different modes of operation. In one embodiment, the sensor electrodes 120 and/or grid electrode 122 may be driven with signals (modulated signals, transmitter signals and/or shield signals) that may differ in any one of phase, amplitude and/or shape. In various embodiments, three modulated signal and transmitter signal are similar in at least one shape, frequency, amplitude and/or phase. In other embodiments, the modulated signal and the transmitter signals are different in frequency, shape, phase, amplitude and phase. The sensor module 244 may be selectively coupled one or more of the sensor electrodes 120 and/or the grid electrode 122. For example, the sensor module 244 may be coupled selected portions of the sensor electrodes 120 and operate in either an absolute or transcapacitive sensing mode. In another example, the sensor module 244 may be a different portion of the sensor electrodes 120 and operate in either an absolute or transcapacitive sensing mode. In yet another example, the sensor module 244 may be coupled to all the sensor electrodes 120 and operate in either an absolute or transcapacitive sensing mode. The sensor module 244 is also configured to operate the grid electrode 122 as a shield electrode. Processing system 110 is configured to operate the grid electrode 122 as a shield electrode that may shield the sensor electrodes 120 from the electrical effects of nearby conductors. In one embodiment, processing system is configured to operate the grid electrode 122 as a shield electrode that may shield sensor electrodes 120 from the electrical effects of nearby conductors and guard the sensor electrodes 120 from grid electrode 122, at least partially reducing the parasitic capacitance between the grid electrode 122 and the sensor electrodes 120. In one embodiment, a shielding signal is driven onto the grid electrode 122. The shielding signal may be a ground signal, such as the system ground or other ground, or any other constant voltage (i.e., non-modulated) signal. In another embodiment, operating the grid electrode 122 as a shield electrode may comprise electrically floating the grid electrode. In embodiment, gird electrode 122 is able to operate as an effective shield electrode while being electrode floated due to its large coupling to the other sensor electrodes. In other embodiment, the shielding signal may be referred to as a guarding signal where the guarding signal is a varying voltage signal having at least one of a similar phase, frequency and amplitude as the modulated signal driven on to the sensor electrodes. In one or more embodiment, routing (e.g., traces 240 and/or 242) may be shielded from responding to an input object due to routing beneath the grid electrode 122 and/or sensor electrodes 120, and therefore may not be part of the active sensor electrodes, shown as sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period, where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between sensor module 244 and display module 248 to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g. near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensor module 244 includes circuitry configured to receive resulting signals with the sensing elements 124 comprising effects corresponding to the modulated signals or the transmitter signals during periods in which input sensing is desired. The sensor module 244 may determine a position of the input object 140 in the sensing region 170 or may provide a signal including information indicative of the resulting signal to another module or processor, for example, determination module or a processor of the electronic system 150 (i.e., a host processor), for determining the position of the input object 140 in the sensing region 170.

The display module 248 may be included in or separate from the processing system 110. The display module 248 includes circuitry confirmed to provide display image update information to the display of the display device 160 during non-sensing (e.g., display updating) periods. In one embodiment, the sensor module 244, and display module 248 may be comprised within a common integrated circuit (first controller). In another embodiment, two of the sensor module 244, sensor module 244 and display module 248 are be comprised in a first integrated circuit and the other one of the three modules is comprised in a second integrated circuit. In those embodiments comprising multiple integrated circuits, a synchronization mechanism may be coupled between them, configured to synchronize display updating periods, sensing periods, transmitter signals, display update signals and the like.

As discussed above, the sensor electrodes 120 of the sensing elements 124 may be formed as discrete geometric forms, polygons, bars, pads, lines or other shape, which are ohmically isolated from one another. In various embodiments, ohmically isolated comprises passively isolated, where active switches may be configured to couple different sensor electrodes to the same signal during a period of time. The sensor electrodes 120 may be electrically coupled through circuitry to form electrodes of having larger plan area relative to a discrete one of the sensor electrodes 120. The sensor electrodes 120 may be fabricated from opaque or non-opaque conductive materials, or the combination of the two. In embodiments wherein the sensor electrodes 120 are utilized with a display device, it may be desirable to utilize non-opaque conductive materials for the sensor electrodes 120. In embodiments wherein the sensor electrodes 120 are not utilized with a display device, it may be desirable to utilize opaque conductive materials having lower resistivity for the sensor electrodes 120 to improve sensor performance. Materials suitable for fabricating the sensor electrodes 120 include ITO, aluminum, silver, copper, molybdenum and conductive carbon materials, among others and various sensor electrodes may be formed of a deposited stack of different conductive materials. The sensor electrodes 120 may be formed as contiguous body of conductive material having little or no open area (i.e., having a planar surface uninterrupted by holes), or may alternatively be fabricated to form a body of material having openings formed therethrough. For example, the sensor electrodes 120 may be formed a from mesh of conductive material, such as a plurality of interconnected thin metal wires. In one embodiment, at least one of the length and width of the sensor electrodes 120 may be in a range of about 1 to about 2 mm. In other embodiments, at least one of the length and width of the sensor electrodes may be less than about 1 mm or greater than about 2 mm. In other embodiment, the length and width may not similar, and one of the length and width may be in the range of about 1 to about 2 mm. Further, in various embodiments, the sensor electrodes 120 may comprise a center to center pitch in the range of about 4 to about 5 mm; however, in other embodiments, the pitch may be less than about 4 mm or greater than about 5 mm.

The grid electrode 122 may be fabricated similar to the sensor electrodes 120. The sensor electrodes 120 and the grid electrode 122 may be coupled to the processing system 110 utilizing conductive routing traces 240, 242 (shown in phantom). The conductive routing traces 240, 242 may be formed in the same plane at least one of the sensor electrodes 120 and the grid electrode 122, or may be formed on one or more separate substrates and connected to the respective electrodes 120, 122 by vias (not shown). Conductive routing traces 240 and 242 may be formed on a metal layer disposed such that the sensor electrodes 120 are between the metal layer and the input object. In one embodiment the metal layer comprises source driver lines and/or gate lines for a display device. The conductive routing traces 240, 242, and vias between them may be obscured from a user by a black mask layer disposed between them and the user of the display device. At least one of the conductive routing traces 240 and 242 may comprise one or more routing traces (conductors) in the source driver metal layer. In one or more embodiments such a layer may be referred to as metal interconnect layer two. Further, conductive routing traces 240 and/or 242 may be disposed on a metal layer between source driver lines. Alternately, at least one of the conductive routing traces 240 and 242 may comprise one or more conductors in the gate driver metal layer or gate driver lines not configured for display updating. Further, conductive routing traces 240 and/or 242 may be disposed on a metal layer between gate driver lines. In another embodiment, at least one of the conductive routing traces 240 and 242 may comprise one or more conductors in the Vcom jumper metal layer or Vcom lines not otherwise configured for display updating. Further, conductive routing traces 240 and/or 242 may be disposed on a metal layer between gate electrodes. In other embodiments the metal layer is included in addition to a layer comprising the source driver lines and/or gate lines. A portion of the conductive traces 140, 142 may also be formed laterally outward of the areal bounds of the sensing elements 124. In various embodiments, the conductive routing traces 240 and/or 242 may be disposed in a Vcom electrode jumper layer. The Vcom electrode jumper layer may be referred to as metal layer three or a metal interconnect layer three. In one embodiment, conductive traces may be disposed on both a source drive layer and a Vcom electrode jumper layer. In various embodiments, the display device may comprise a "dual gate" or half source driver" configuration, allowing conductive routing traces 240 and/or 242 to be disposed between source drivers on the source driver layer. In one or more embodiments, orthogonal directions of connections between the conductive routing traces 240 and 242 they may be place on separate layers with vias between them In some embodiments, the sectional area of the conductive routing traces 240 may vary. For example, the sectional area of the conductive routing traces 240 coupled to a sensor electrode 120 that is further from the processing system 110 relative to the sectional area of the conductive routing traces 240 coupled to a sensor electrode 120 that is closer to the processing system 110. The increased sectional area of the conductive routing traces 240 that extend farther from the processing system 110 functions to reduce the resistance of the conductive routing traces 240 coupled to the sensor electrodes 120 that are further from the processing system 110, thereby increasing device performance.

The grid electrode 122 is disposed between at least two of the sensor electrodes 120. The grid electrode 122 may at least partially circumscribe the plurality of sensor electrodes 120 as a group, and may also, or in the alternative, completely or partially circumscribe one or more of the sensor electrodes 120. In one embodiment, the grid electrode 122 is a planar body 212 having a plurality of apertures 210, each aperture 210 circumscribing a respective one of the sensor electrodes 120. Accordingly, the grid electrode 122 separates and circumscribes at least 3 or more of sensor electrodes 120, and in this example, separates and circumscribes all of sensor electrodes 120. The gap 206 spaces the body 212 from the sensor electrode 120 disposed in the aperture 210. In one or more embodiments, the grid electrode 122 is configured to substantially fill the space defined by the gap 206. In one embodiment a second grid electrode may be disposed on a substrate between grid electrode 122 and a touch input layer. The second grid electrode may be the same size as grid electrode 122, or larger than grid electrode 122 such that is overlaps one more sensor electrodes 120 and grid electrode or smaller than grid electrode 122 such that it overlaps a portion of the grid electrode 122. In various embodiments, the grid electrode 122 is disposed between at least two of sensor electrodes 120 such that the grid electrode 122 is on different layer (i.e., different substrate or side of the same substrate) and overlaps a portion of at least two sensor electrodes and the gap between the sensor electrodes. In the embodiments where the sensor electrodes 120 comprise one or more common electrodes, the sensor electrodes may comprise the entirety of the common electrode layer.

The grid electrode 122 may also be segmented. The segmentation of the grid electrode 122 may allow segments of the grid electrode 122 be less visible. The segments may be interconnect using traces or vias, so that the all the segments of the grid electrode 122 may be driven simultaneously with a common signal. Alternatively, one or more of the segments of the grid electrode 122 may be driven independently to facilitate scanning of the sensor electrodes 120 when configured as receiver electrodes in certain modes of operation as discussed further below.

An alternative grid electrode 122 that may be used in the input device 100 of FIG. 1 may comprise substantially more surface area than the sensor electrodes 120. For example, the grid electrode 122 may at least partially circumscribe one or more sensor electrodes 120. Additionally, or in the alternative, the grid electrode 122 may completely circumscribe at least one sensor electrode 120 and only partially circumscribes other sensor electrodes 120. In other embodiments, the grid electrode 122 may completely circumscribe all of the sensor electrodes 120. It is also contemplated that the grid electrode 122 may be segmented.

In another example, each sensor electrode 120 may be coupled to a different conductive routing trace 240 and to a common pin of processing system 110. For example, a multiplexer (or similar circuit element) may be coupled to the conductive routing trace or traces 240 so that the sensor electrodes 120 may be individually coupled to the processing system 110 when sharing a conductive routing trace 240. In one other example, each sensor electrode 120 may be coupled to a different conductive routing trace 240, where each conductive routing trace 240 is coupled to a different pin of processing system 110. Processing system 110 may be configured to simultaneously receive with multiple sensor electrodes 120 or receive with each sensor electrode 120 independently. In one embodiment, processing system 110 may be configured to receive with a plurality of sensor electrodes 120 using a scanning time multiplexed scheme when more than one grid electrode is driven with a transmitter signal. The grid electrodes may be adjacent to each other or non-adjacent to each other. In one embodiment, two sensor electrodes may be simultaneously received with while grid electrode that corresponds to one of the sensor electrodes is driven with a transmitter signal.

Processing system 110 may be configured to simultaneously drive transmitter signals onto each grid electrode 122 and receive resulting signals with the sensor electrodes 120. In such an embodiment, each grid electrode 122 may be driven with a transmitter signal that is based on a different one of a plurality of digital codes. The digital codes may be any code such that they provide mathematical independent results. In one embodiment, the digital codes for the set of transmitters are substantially orthogonal—i.e., exhibit very low cross-correlation, as is known in the art. Note that two codes may be considered substantially orthogonal even when those codes do not exhibit strict, zero cross-correlation. In a particular embodiment, for example, the digital codes are pseudo-random sequence codes. In other embodiments, Walsh codes, Gold codes, or another appropriate quasi-orthogonal or orthogonal codes are used. In another embodiment, processing system 110 is configured to simultaneously drive the grid electrodes 122 with the same transmitter signal while independently receiving with the sensor electrodes 120. Some substantially orthogonal codes may be selected that have near zero sums which reduce the effect of the codes coupling to display elements, one set of such codes are circulant codes where each code vector is a rotation of the other vectors.

Processing system 110 may be configured to scan through the grid electrodes 122, driving transmitter signals on to the grid electrodes 122 one at a time, while receiving with the sensor electrodes 120. In one embodiment, only those sensor electrodes 120 that are circumscribed by the grid electrode 122 which is being driven are received with. In other embodiments, all of or some portion of the sensor electrodes 120 may be received with a grid electrode 122 that is being driven.

Processing system 110 may be configured to selectively configure the grid electrode 122 or sensor electrodes 120 based on the positional information of an input object 140. For example, in one embodiment, processing system 110 may drive transmitter signals onto the grid electrodes 122 such that the grid electrode is driven as one large grid electrode 122. Processing system 110 may selectively drive only a portion of the grid electrodes 122 that are proximate the detected input object or objects 140. In another embodiment, For example, in one embodiment, processing system 110 may drive shielding signals onto the grid electrodes 122 such that the grid electrode is driven as one large grid electrode 122. Further, processing system 110 may selectively drive only a portion of the grid electrodes 122 with a shielding signal that are proximate the detected input object or objects 140. In one embodiment the driving scheme (as discussed above) used to drive the grid electrode 122 may vary based on the positional information of the input object or objects 140.

Figure 3:
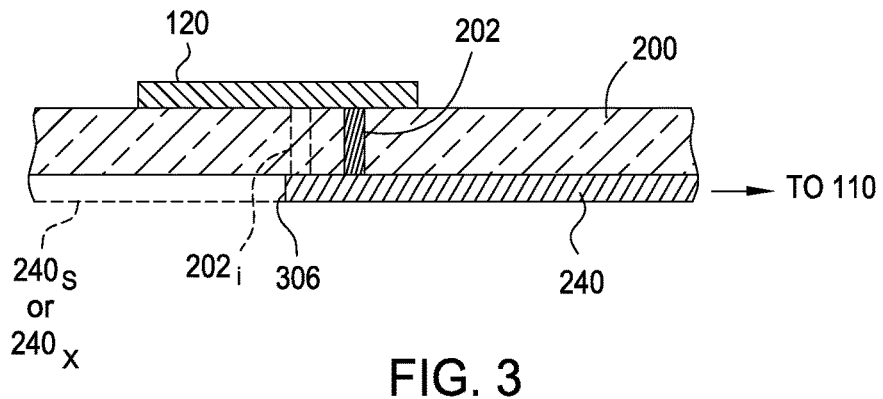
FIG. 3 is a simplified sectional view of a sensor electrode of the sensor elements of FIG. 1 illustrating a routing trace coupled to the sensor electrode by a via.

FIG. 3 is a simplified sectional view of a sensor electrode 120 of the sensing elements 124 of FIG. 1 illustrating a conductive routing trace 240 coupled to the sensor electrodes 120 by one or more vias 202. Although not shown in FIG. 3, the grid electrode 122 may be similarly connected to the conductive routing trace 242 by one or more vias 202. In the embodiment depicted in FIG. 3, a single via 202 is shown in cross section, while a single via $202_i$ is shown in phantom to represent one or more optional vias. A sensor electrode 120 directly coupled through one or more vias 202 to a conductive routing trace 240 may be referred to as a "paired" sensor electrode and conductive routing trace.

The sensor electrode 120 is disposed on a substrate 200. The substrate 200 may be any suitable substrate that is part of the input device 100 or display device 160. The substrate 200 is generally fabricated from, covered or coated with a dielectric material to prevent cross-talk between the sensor electrodes 120. The via 202 (and optional one or more vias 202i, if present) is formed through the substrate 200 to ohmically couple the sensor electrode 120 to the conductive routing trace 240 through the substrate 200.

In the embodiment depicted in FIG. 3, the sensor electrode 120 and the conductive routing trace 240 are shown on disposed on opposite sides of the substrate 200. However, in other embodiments, the sensor electrode 120 and the conductive routing trace 240 may be disposed on the same side of the substrate 200. In yet other embodiments, the sensor electrode 120 and the conductive routing trace 240 may be separated by one or more additional substrates (or layers) that are stacked with the substrate 200.

In the embodiment depicted in FIG. 3, the conductive routing trace 240 includes a first end (not shown) and a terminal end 306. The first end of the conductive routing trace 240 generally extends beyond the bounds of the array of sensor electrodes 120 and is coupled to the processing system 110. The terminal end 306 is opposite the first end, and in some embodiments, is located below the sensor electrode 120 to which the conductive routing trace 240 is coupled to by the via 202.

In some other embodiments, the conductive routing trace 240 may optionally extend substantially beyond the via 202. The optional extension of the conductive routing trace 240 is illustrated in phantom in FIG. 3 and identified with reference numeral $240_X$. The extensions $240_X$ are coplanar with at least the conductive routing traces 240 to which the extensions $240_X$ are collinearly aligned. When the extension $240_X$ of the conductive routing trace 240 is present beyond the via 202, the terminal end 306 is located at the end of the extension $240_X$ furthest from the via 202 (and processing system 110), as shown in phantom in FIG. 3.

In some other embodiments, the conductive routing trace 240 may optionally be segmented, thus forming one or more conductive lines $240_S$. The conductive lines $240_S$ may optionally extend substantially beyond the via 202. The optional segment of the conductive routing trace 240 is illustrated in phantom as the conductive line $240_S$ and may have the same sectional profile as the conductive routing trace 240. The conductive line $240_S$ is generally aligned co-linear with the extension $240_X$ of the conductive routing trace 240, as additionally shown in phantom in FIG. 4.

Figure 4:
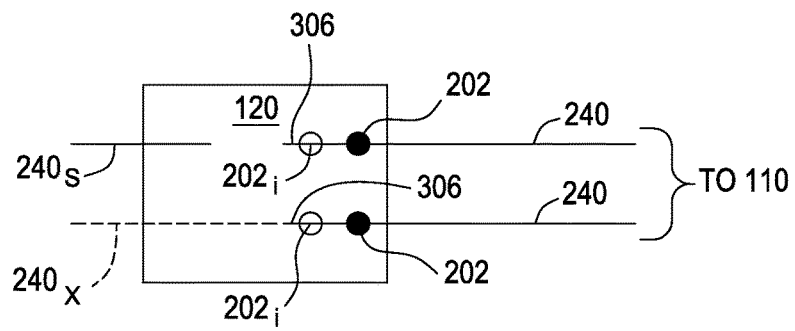
FIG. 4 is a simplified transparent top view schematically illustrating the arrangement and connections between the conductive routing traces, vias and sensor electrode corresponding to the illustration of FIG. 3.

FIG. 4 is a simplified transparent top view schematically illustrating the arrangement and connections between the conductive routing traces 240, vias 202 ($202_i$) and the sensing elements 124, such as sensor electrode 120, corresponding to the illustration of FIG. 3. Connections with the grid electrode 122 may be similarly configured. The substrate 200 is not shown in FIG. 4, and the sensor electrode 120 is shown as being transparent to allow the positions of the one or more vias 202 ohmically coupling the conductive routing trace 240 to the sensor electrode 120 to be illustrated in a single figure.

The vias 202 illustrated by a solid circle in FIG. 4 represent locations where an actual via is present. The vias $202_i$ illustrated by an open (non-filled in) circle in FIG. 4 represent locations where one or more additional vias could optionally be utilized.

The conductive routing traces 240 illustrated in FIG. 4 terminate at the terminal ends 306. In certain embodiments, the conductive routing traces 240 may optionally extend further than the solid line indicating the conductive routing traces 240, as shown by the dashed line $240_X$.

Optionally, one or more conductive lines $240_S$ may be disposed below one or more of the sensor electrodes 120. Each conductive line $240_S$ is coupled to one of the sensor electrodes 120 by a via 202, and optionally, one or more additional vias $202_i$. The conductive line $240_S$ is not directly coupled to the processing system 110, but rather coupled to the processing system 110 through the sensor electrode 120 and the paired conductive routing trace 240. Thus, the conductive line $240_S$ is not directly connected to the conductive routing trace 240. In one embodiment, the conductive line $240_S$ is collinear with one of the conductive routing traces 240. In some embodiments, a plurality of spaced apart and electrically separated conductive lines $240_S$ are collinear with one of the conductive routing traces 240. In some embodiments having a plurality of spaced apart and electrically separated conductive lines $240_S$, each conductive line $240_S$ is disposed under a separated one of the sensor electrodes 120.

Figure 5:
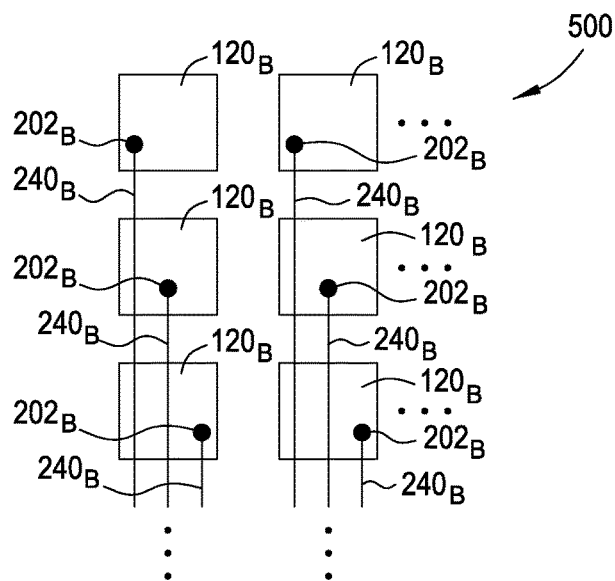
FIG. 5 is a simplified transparent top view schematically illustrating the arrangement and connections between base conductive routing traces, base vias and base sensor electrodes arranged in a base pattern that may be utilized in the input device of FIG. 1.

FIG. 5 is a simplified transparent top view schematically illustrating an arrangement and connections between base conductive routing traces $240_B$, base vias $202_B$ and base sensor electrodes $120_B$ arranged in a base pattern 500 (a portion of which is shown in FIG. 5) that may be utilized in the input device of FIG. 1. The base pattern 500 provides a base line for an RC load of the base conductive routing traces $240_B$ from which the RC load of other patterns of sensors electrodes described with reference to FIGS. 6-9 can be compared. That is, when comparing another sensor pattern to the base pattern 500, the configuration of the base pattern 500 is selected to have a pattern, geometry and size of the base sensor electrodes $120_B$, and a sectional area of the base conductive routing traces $240_B$, which are identical to the sensors pattern to which the base pattern 500 is being compared.

In the base pattern 500, each base conductive routing trace $240_B$ is coupled to a single base sensor electrode $120_B$ by a single base via $202_B$, and the base conductive routing trace $240_B$ does not extend beyond the base via connecting the base conductive routing trace $240_B$ to the base sensor electrode $120_B$. This configuration of the base pattern 500 provides a base RC load of the connection between the base conductive routing trace $240_B$ and the base sensor electrode $120_B$ to the processing system 110. The embodiments of sensing elements 124 described below with reference to FIGS. 6-9 provide an improvement in the RC load over the base RC load of the base pattern 500 described above. The base pattern 500 may also be configured to provide a base RC load for the grid electrodes 122 comprising the sensing elements 124

Figure 6:
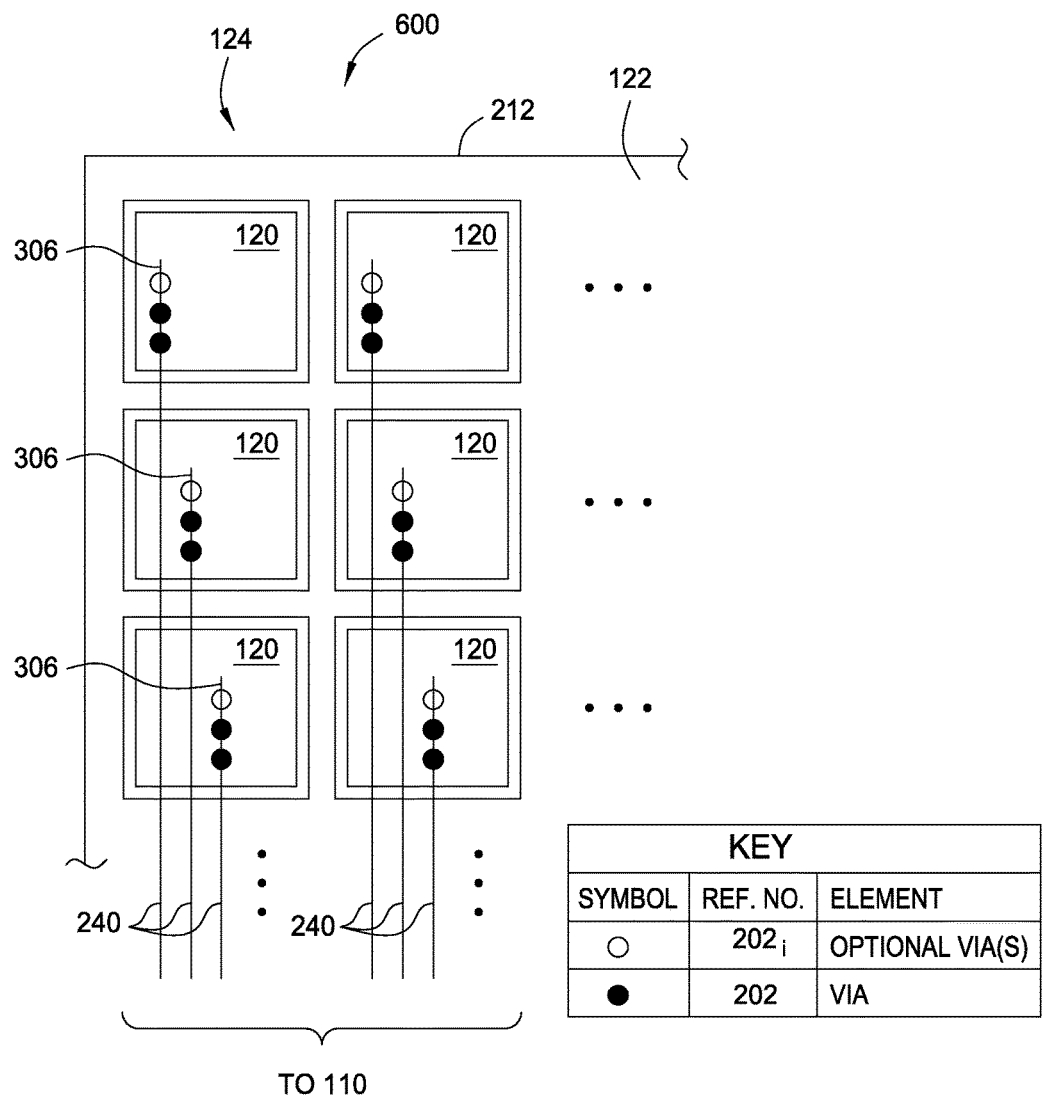
FIG. 6 is a simplified transparent top view schematically illustrating the arrangement and connections between the conductive routing traces, vias and sensor electrodes that may be utilized in the input device of FIG. 1, according to another embodiment which has improved RC load characteristics as compared to a corresponding base pattern of base sensor electrodes and base conductive routing traces.

FIG. 6 is a simplified transparent top view schematically illustrating an arrangement and connections between the conductive routing traces 240, vias 202 and sensing elements 124 defining a sensor pattern 600 that may be utilized in the input device 100 of FIG. 1. The sensor pattern 600 has improved RC load characteristics as compared to a corresponding base pattern of base sensor electrodes and base conductive routing traces, such as illustrated in FIG. 5. Although a specific that sensor pattern 600 is illustrated as an example in FIG. 6 having a pattern, geometry and size of sensor electrodes 120 and sectional area of the conductive routing traces 240, it is contemplated that the sensor pattern 600 may have other configurations for the sensor electrodes 120 and that the conductive routing traces 240, and that the corresponding base pattern 500 of the sensor pattern 600 will have an identically corresponding pattern, geometry and size of base sensor electrodes $120_B$, and sectional area of the base conductive routing traces $240_B$. Stated differently, the pattern, geometry and size of sensor electrodes 120 and the base sensor electrodes $120_B$ would be identical, while the sectional area of the conductive routing trace 240 and the base conductive routing trace $240_B$ would be identical. Similarly, the sensor pattern 600 may be defined utilizing the grid electrode 122 and the conductive routing traces 242.

The sensor pattern 600 includes an array of sensor electrodes 120 which may be arranged was described above with reference to FIG. 2. Each sensor electrodes 120 is coupled to at least one conductive routing trace 240 by a plurality of vias 202. For example, each conductive routing trace 240 of the sensor pattern 600 illustrated in FIG. 6 is coupled to a single sensor electrode 120 by at least two via 202. One or more optional vias $202_i$ may also couple the conductive routing trace 240 to the sensor electrode 120 in addition to the two vias 202.

Here, the multiple vias 202, 202, connecting each paired sensor electrode 204 and conductive routing trace 240 result in a lower RC load of the paired sensor electrode 204 and conductive routing trace 240 of the sensor pattern 600 as compared to a corresponding base pattern of sensor electrodes, for example as shown in FIG. 5, which has a single base via coupling a paired base electrode and base conductive routing trace. The multiple vias 202, $202_i$ beneficially reduce the resistance of the connection between each paired electrode and conductive routing trace. Furthermore, the reduced resistance provided by the multiple vias 202, $202_i$ also result in lower power consumption. Additionally, the multiple vias 202, $202_i$ beneficially provide better spatial uniformity of settling across the area occupied by the sensor electrode 120 during both touch sensing and display updating. Moreover, the multiple vias 202, 202, beneficially increase reliability and fabrication yield by increasing the probability that at least one of the vias has a robust connection between the paired electrode and conductive routing trace.

Figure 7:
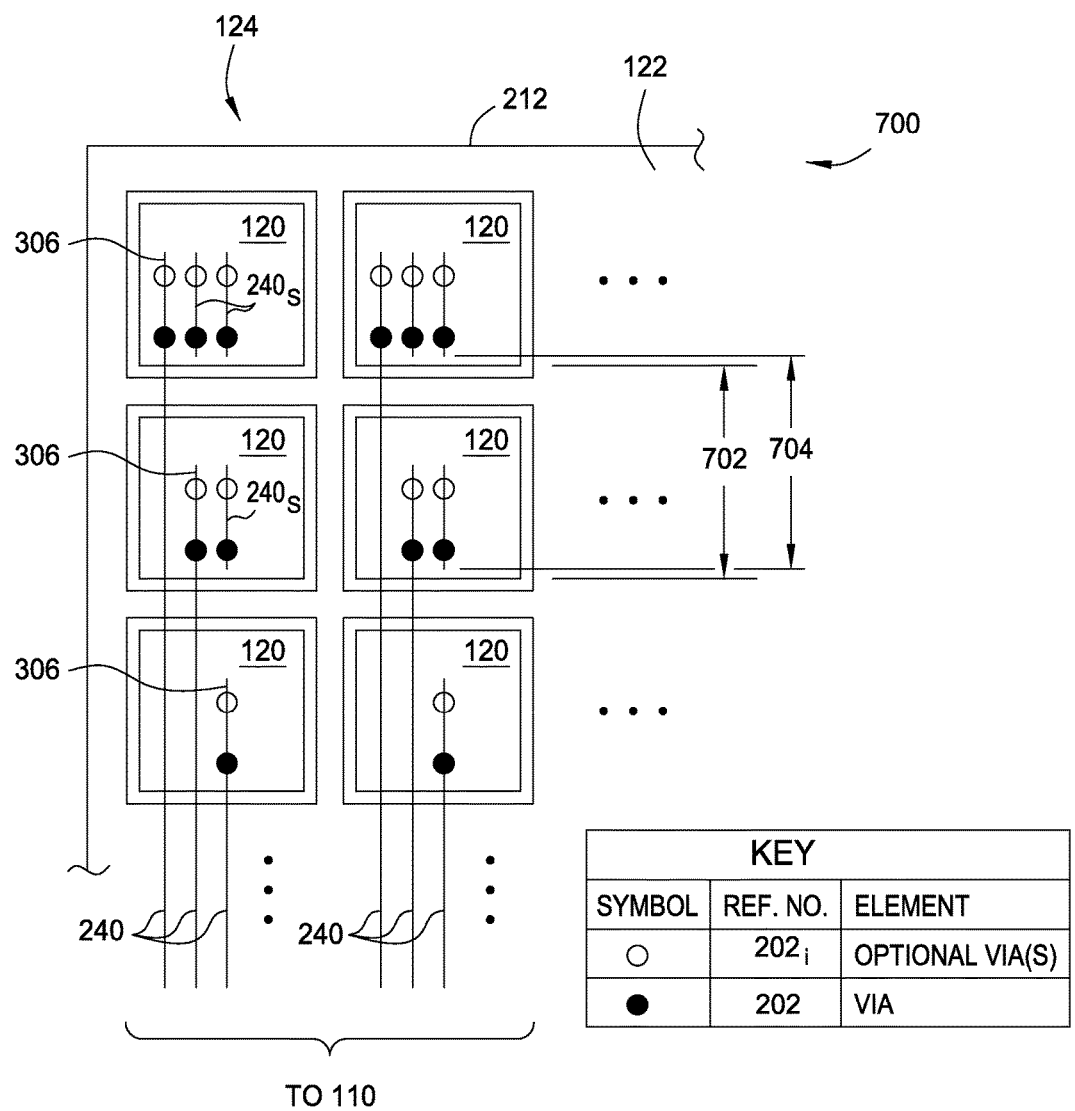
FIG. 7 is a simplified transparent top view schematically illustrating the arrangement and connections between the conductive routing traces, vias and sensor electrodes that may be utilized in the input device of FIG. 1, according to another embodiment which has improved RC load characteristics as compared to a corresponding base pattern of base sensor electrodes and base conductive routing traces.

FIG. 7 is a simplified transparent top view schematically illustrating an arrangement and connections between the conductive routing traces 240, vias 202 and sensing elements 124 defining a sensor pattern 700 that may be utilized in the input device 100 of FIG. 1, which has improved RC load characteristics as compared to a corresponding base pattern of base sensor electrodes and base conductive routing traces, such as illustrated in FIG. 5. Although a specific that sensor pattern 700 is illustrated as an example in FIG. 7 having a pattern, geometry and size of sensor electrodes 120, and sectional area of the conductive routing traces 240, it is contemplated that the sensor pattern 700 may have other configurations of these attributes for the sensor electrodes 120 and that the conductive routing traces 240, and that the corresponding base pattern 500 to which the sensor pattern 700 is being compared would have an identically corresponding pattern, geometry and size of the base sensor electrodes $120_B$, and sectional area of the base conductive routing traces $240_B$. Similarly, the sensor pattern 700 may be defined utilizing the grid electrode 122 and the conductive routing traces 242.

The sensor pattern 700 includes an array of sensor electrodes 120 which may be arranged was described above with reference to FIG. 2. Each sensor electrodes 120 is coupled to at least one conductive routing trace 240 by at least one via 202. One or more sensor electrodes 120 are additionally coupled to at least one conductive line $240_S$ by at least one via 202. For example, a single sensor electrode 120 of the sensor pattern 700 illustrated in FIG. 7 is coupled to a conductive routing trace 240 by at least one via 202, and is also coupled to at least one conductive line $240_S$ by at least one via 202, wherein the conductive line $240_S$ is not coupled to another sensor electrode 120. One or both of the conductive routing trace 240 and the conductive line $240_S$ may optionally be coupled to sensor electrode 120 by one or more optional vias $202_i$ in addition to the vias 202.

In some embodiments, the sensor electrodes 120 may be coupled to a plurality of conductive line $240_S$. The plurality of conductive line $240_S$ coupled to a common one of the sensor electrodes 120 may have a parallel and coplanar orientation. Some of the plurality of conductive lines $240_S$ may be collinearly aligned, and each of the collinearly aligned conductive lines $240_S$ may be coupled to collinearly aligned sensor electrodes 120, for example, sensor electrodes 120 arranged in a common row or common column. The collinearly aligned conductive lines $240_S$ are, as discussed above with reference to FIG. 2, collinearly aligned with one of the conductive lines $240_S$ that is not coupled to one of the sensor electrodes 120 to which one of the collinearly aligned conductive lines $240_S$ are coupled. In one or more embodiments, the collinearly aligned conductive lines $240_S$ have a pitch 704 that is about equal to a pitch 702 of the collinearly aligned sensor electrodes 120.

Presence of the conductive lines $240_S$ result in a lower RC load of the paired sensor electrode 204 and conductive routing trace 240 of the sensor pattern 600 as compared to a corresponding base pattern of sensor electrodes, for example as shown in FIG. 5, which have a single base via coupling a paired base electrode and base conductive routing trace. The conductive lines $240_S$ beneficially reduce background capacitance and improves settling time of the input device 100. Moreover, the reduced capacitance provided by the conductive lines $240_S$ also result in lower power consumption.

Figure 8:
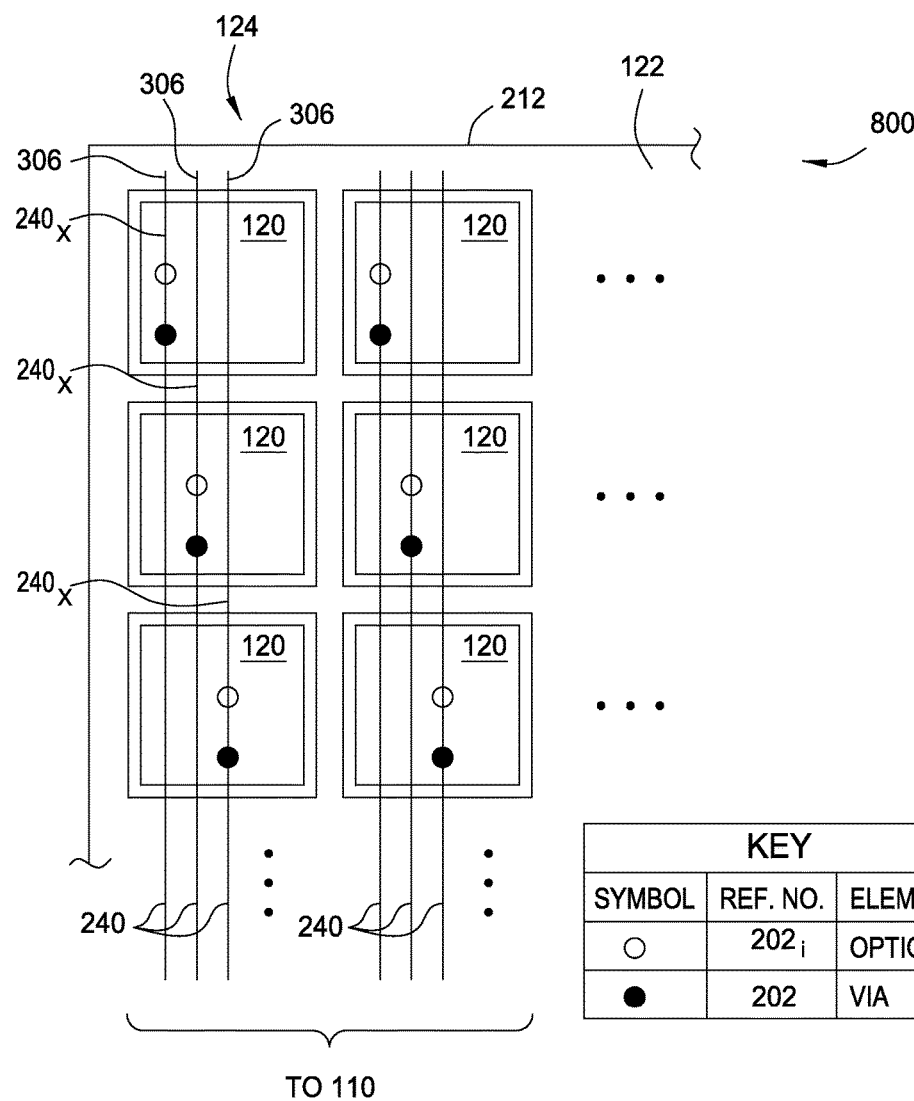
FIG. 8 is a simplified transparent top view schematically illustrating the arrangement and connections between the conductive routing traces, vias and sensor electrodes that may be utilized in the input device of FIG. 1, according to another embodiment which has improved RC load characteristics as compared to a corresponding base pattern of base sensor electrodes and base conductive routing traces.

FIG. 8 is a simplified transparent top view schematically illustrating an arrangement and connections between the conductive routing traces 240, vias 202 and sensing elements 124 defining a sensor pattern 800 that may be utilized in the input device 100 of FIG. 1, which has improved RC load characteristics as compared to a corresponding base pattern of sensor base electrodes and base conductive routing traces, such as illustrated in FIG. 5. Although a specific that sensor pattern 800 is illustrated as an example in FIG. 8 having a pattern, geometry and size of sensor electrodes 120, and sectional area of the conductive routing traces 240, it is contemplated that the sensor pattern 800 may have other configurations of these attributes for the sensor electrodes 120 and that the conductive routing traces 240, and that the corresponding base pattern 500 to which the sensor pattern 800 is being compared would have an identically corresponding pattern, geometry and size of the base sensor electrodes $120_B$, and sectional area of the base conductive routing traces $240_B$. Similarly, the sensor pattern 800 may be defined utilizing the grid electrode 122 and the conductive routing traces 242.

The sensor pattern 800 includes an array of sensor electrodes 120 which may be arranged was described above with reference to FIG. 2. Each sensor electrodes 120 is coupled to at least one conductive routing trace 240 by at least one via 202. In FIG. 8, one or more optional vias $202_i$ are shown. At least the conductive routing traces 240 that are coupled to the sensor electrodes 120 closer to the processing system 110 includes an extension $240_X$ that extends the conductive routing trace 240 beyond the via 202 coupling the conductive routing trace 240 its pair sensor electrode 120. For example, a conductive routing trace 240 paired by a via 202 to one sensor electrode 120 may include an extension $240_X$ that extends beyond the paired sensor electrode 120 and under at least one collinearly aligned sensor electrode 120. In this manner, the sensor electrodes 120 farthest from the processing system 110 have a plurality of extensions $240_X$ passing thereunder that are coupled by vias 202 to collinearly aligned sensor electrodes 120 that are closer to the processing system 110. The extensions $240_X$ are generally coplanar and parallel to each other, and are not coupled to other sensor electrodes 120. In one embodiment, the extensions $240_X$ extend at least under the sensor electrodes 120 that are furthest from the processing system 110. In other embodiments, the extensions $240_X$ extend beyond the sensor electrodes 120 that are furthest from the processing system 110.

Presence of parallel extensions $240_X$ of adjacent conductive lines $240_S$ other result in a lower RC load of the paired sensor electrode 120 and conductive routing trace 240 of the sensor pattern 600 as compared to a corresponding base pattern of sensor electrodes, for example as shown in FIG. 5, which have the base conductive routing trace ending at the single base via coupling the base conductive routing trace to a paired base electrode. The extensions $240_X$ of the conductive lines $240_S$ beneficially reduce background capacitance and improves settling time of the input device 100. Moreover, the reduced capacitance provided by the extensions $240_X$ of the conductive lines $240_S$ also result in lower power consumption.

Figure 9:
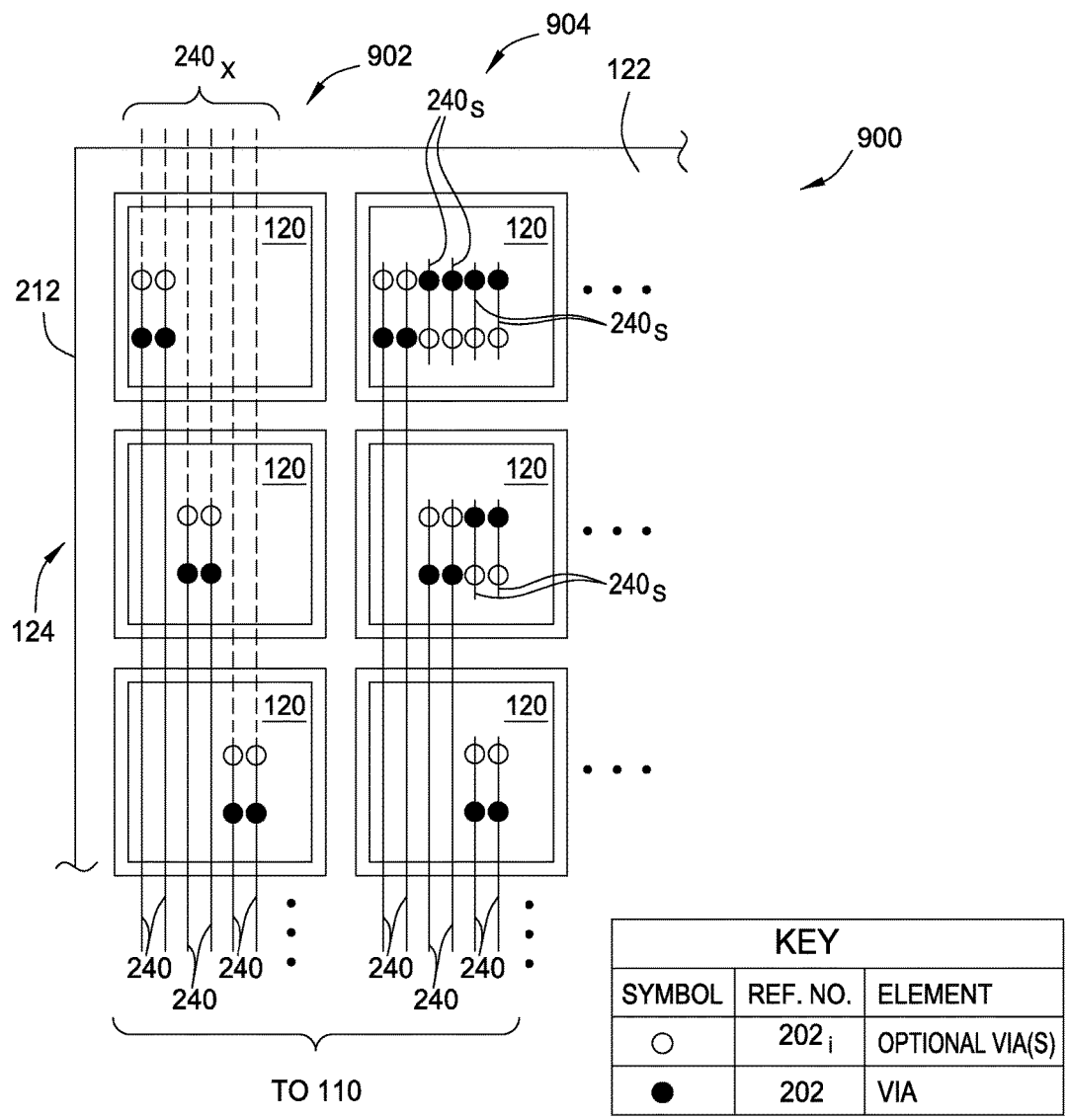
FIG. 9 is a simplified transparent top view schematically illustrating the arrangement and connections between the conductive routing traces, vias and sensor electrodes that may be utilized in the input device of FIG. 1, according to another embodiment which has improved RC load characteristics as compared to a corresponding base pattern of base sensor electrodes and base conductive routing traces.

FIG. 9 is a simplified transparent top view schematically illustrating an arrangement and connections between the conductive routing traces 240, vias 202 and sensing elements 124 defining a sensor pattern 900 that may be utilized in the input device 100 of FIG. 1, which has improved RC load characteristics as compared to a corresponding base pattern of sensor electrodes and conductive routing traces, such as illustrated in FIG. 5. Although a specific that sensor pattern 900 is illustrated as an example in FIG. 9 having a pattern, geometry and size of sensor electrodes 120, and sectional area of the conductive routing traces 240, it is contemplated that the sensor pattern 900 may have other configurations of these attributes for the sensor electrodes 120 and that the conductive routing traces 240, and that the corresponding base pattern 500 to which the sensor pattern 900 is being compared would have an identically corresponding pattern, geometry and size of the base sensor electrodes $120_B$, and sectional area of the base conductive routing traces $240_B$. Similarly, the sensor pattern 900 may be defined utilizing the grid electrode 122 and the conductive routing traces 242.

The sensor pattern 900 includes an array of sensor electrodes 120 which may be arranged was described above with reference to FIG. 2. Each sensor electrode 120 is coupled to at least two conductive routing traces 240 by one or more vias 202. In column 902 of sensor electrode 120, each sensor electrodes 120 is coupled by a via 202, and optionally one or more vias $202_i$, to each paired conductive routing trace 240. The sensor electrodes 120 of column 902 may optionally be collinear. The conductive routing traces 240 may include optionally extensions $204_X$.

Beneficially, the use of least two conductive routing traces 240 coupled to each sensor electrode 120 reduces the resistance of the electrical connection between the sensor electrode 120 and the processing system 110. The reduced resistance provides a reduction in power consumption and beneficially provides better spatial uniformity of settling across the area occupied by the sensor electrode 120 during both touch sensing and display updating. Moreover, the multiple conductive routing traces 240 coupled to each sensor electrode 120 beneficially increase reliability and fabrication yield by increasing the probability that at least one of the conductive routing traces 240 has a robust connection to the paired sensor electrode.

Additionally, the optional extensions $204_X$ beneficially reduces background capacitance and improves settling time of the input device 100. Moreover, the reduced capacitance provided by the optional extensions $204_X$ also result in lower power consumption.

In some embodiments, at least one sensor electrode 120 of a collinear group of sensor electrodes is coupled to at least two paired conductive routing traces, while at least a second sensor electrode 120 of the collinear group of sensor electrodes has the at least two paired conductive routing traces passing thereunder and is coupled to a different number of conductive routing traces 240. For example, the sensor electrodes 120 farthest from the processing system 110 have a greater number of conductive routing traces 240 relative to the number of the conductive routing traces 240 coupled to the sensor electrodes 120 closest from the processing system 110. In this manner, the wiring resistance to sensor electrodes farthest from the processing system is reduced, thereby improving device performance.

The entirety, portions or none of sensor pattern 900 may be configured as described with reference to column 902. In other embodiments, the entirety, portions or none of sensor pattern 900 may be configured as described below with reference to column 904.

Each sensor electrode 120 comprising column 904 is also coupled to at least two conductive routing traces 240 by one or more vias 202. In column 904 of sensor electrode 120, each sensor electrodes 120 is coupled by a via 202 and optionally one or more vias $202_i$ to each paired conductive routing trace 240. The sensor electrodes 120 of column 904 may optionally be collinear.

For example, each conductive routing trace 240 of the sensor pattern 900 illustrated in FIG. 9 is coupled to a single sensor electrode 120 by at least two vias 202. One or more optional vias $202_i$ may also couple the conductive routing trace 240 to the sensor electrode 120 in addition to the two vias 202.

At least the conductive routing traces 240 that are coupled to the sensor electrodes 120 closer to the processing system 110 in column 904 may include extensions $240_X$ that extend the conductive routing traces 240 beyond the vias 202 coupling the conductive routing traces 240 to their paired sensor electrode 120. For example, a conductive routing trace 240 paired by a via 202 to one sensor electrode 120 may include an extension $240_X$ that extends beyond the paired sensor electrode 120 and under at least one collinearly aligned sensor electrode 120. In this manner, the sensor electrodes 120 farthest from the processing system 110 have a plurality of extensions $240_X$ passing thereunder that are coupled by vias 202 to sensor electrodes 120 that are coupled closer to the processing system 110. The extensions $240_X$ are generally parallel to each other and are not coupled to other sensor electrodes 120. In one embodiment, the extensions $240_X$ extend at least under the sensor electrodes 120 that are furthest from the processing system 110. In other embodiments, the extensions $240_X$ extend beyond the sensor electrodes 120 that are furthest from the processing system 110.

The conductive lines $240_S$ and/or extensions $240_X$ of the conductive lines $240_S$ comprising the sensor pattern 900 being parallel to each other result in a lower RC load of the paired sensor electrode 120 and conductive routing trace 240 of the sensor pattern 900 as compared to a corresponding base pattern of sensor electrodes, for example as shown in FIG. 5, which have the base conductive routing trace ending at the single base via coupling the base conductive routing trace to a paired base electrode. The conductive lines $240_S$ and/or the extensions $240_X$ of the conductive routing traces 240 beneficially reduce background capacitance and improves settling time of the input device 100. Moreover, the reduced capacitance provided by the conductive lines $240_S$ and/or extensions $240_X$ of the conductive lines $240_S$ also results in lower power consumption.

The techniques for reducing the RC load of the paired sensor electrode 120 and conductive routing trace 240 described above may similarly be utilized to reduce the RC load between the grid electrode 122 and the conductive routing trace 242. For example, the conductive routing trace 242 may be connected to the grid electrode 122 by a plurality of vias 202. The conductive routing trace 242 may have extensions extending beyond the via(s) 202 connecting to the conductive routing trace 242 to the grid electrode 122. Conductive lines disposed parallel to the conductive routing traces 242 may reside in coplanar with the conductive routing traces 242.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

What is claimed is:

1. An input device comprising:
   a plurality of sensing elements arranged in a sensor pattern, the plurality of sensing elements including a first sensor electrode and a second sensor electrode; and
   a plurality of conductive routing traces disposed below the plurality of sensing elements, each of the conductive routing traces conductively paired with a respective sensor electrode of the plurality of sensing elements and configured to communicatively couple the respective sensor electrode to driver circuitry of a processing system, wherein the first sensor electrode is conductively paired with at least two of the conductive routing traces and wherein the second sensor electrode is conductively paired with fewer or more conductive routing traces than the first sensor electrode.

2. The input device of claim 1 further comprising:
   a plurality of vias coupling each of the at least two conductive routing traces to the first sensor electrode.

3. The input device of claim 1 further comprising:
   a via coupling a first conductive routing trace of the at least two conductive routing traces to the first sensor electrode, the first conductive routing trace extending to an uncoupled end, wherein a region of the first conductive routing trace extending between the via and the uncoupled end is disposed below the second sensor electrode.

4. The input device of claim 3, wherein the first sensor electrode is the only sensing element of the sensing elements conductively coupled to the first conductive routing trace.

5. The input device of claim 1 further comprising:
   a first via coupling a first conductive routing trace of the at least two conductive routing traces to the first sensor electrode, the first conductive routing trace extending to an uncoupled end; and
   a conductive line linearly aligned with the first conductive routing trace, the conductive line not coupled to the first sensor electrode and disposed below the second sensor electrode.

6. The input device of claim 1, wherein a number of conductive routing traces conductively paired with the second sensor electrode is based at least in part on a distance between the processing system and the second sensor electrode.

7. The input device of claim 6, wherein the conductive routing traces conductively paired with the first sensor electrode do not extend below the second sensor electrode.

8. The input device of claim 6, wherein the conductive routing traces conductively paired with the first sensor electrode extend below the second sensor electrode.

9. The input device of claim 1 further comprising:
   a conductive line aligned with the at least two conductive routing traces conductively paired with the first sensor electrode and disposed below the second sensor electrode, the conductive line coupled to the second sensor electrode but not the first sensor electrode.

10. The input device of claim 1 further comprising:
    a first via coupling a first conductive routing trace of the plurality of conductive routing traces to the first sensor electrode; and
    a second via coupling a second conductive routing trace of the plurality of conductive routing traces to the second sensor electrode, the second conductive routing trace extending below the first sensor electrode.

11. The input device of claim 1 further comprising:
    a first via coupling a first conductive routing trace of the plurality of conductive routing traces to the first sensor electrode; and
    a second via coupling a second conductive routing trace of the plurality of conductive routing traces to the second sensor electrode, wherein the second conductive routing trace is wider than the first conductive routing trace.

12. The input device of claim 6, wherein the second sensor electrode is located closer to the processing system than the first sensor electrode, and wherein the second sensor electrode is conductively paired with fewer conductive routing traces than the first sensor electrode.

13. An input device comprising:
    a plurality of sensor electrodes arranged in a matrix array adapted to detect presence of an input device in a sensing area associated with the matrix array; and
    a plurality of conductive routing traces conductively paired with the plurality of sensor electrodes and configured to communicatively couple the sensor electrodes to driver circuitry of a processing system, wherein each of the sensor electrodes is coupled to a number of the conductive routing traces based at least in part on a distance of the sensor electrode from the processing system, and wherein a first sensor electrode of the plurality of sensor electrodes is conductively paired with more conductive routing traces than a second sensor electrode of the plurality of sensor electrodes.

14. The input device of claim 13, wherein at least one of the plurality of sensor electrodes is conductively paired with two or more of the conductive routing traces.

15. The input device of claim 13, wherein a conductive routing trace coupled to a first sensor electrode of the plurality of sensor electrodes is wider than a conductive routing trace coupled to a second sensor electrode of the plurality of sensor electrodes.

16. The input device of claim 13, wherein conductive routing traces coupled to the first sensor electrode do not extend below the second sensor electrode.

17. The input device of claim 13, wherein conductive routing traces coupled to the first sensor electrode extend below the second sensor electrode.

18. The input device of claim 13, further comprising:
    a conductive line aligned with at least two conductive routing traces coupled to the first sensor electrode and disposed below the second sensor electrode, the conductive line coupled to the second sensor electrode but not the first sensor electrode.

19. The input device of claim 13, wherein the second sensor electrode is located closer to the processing system than the first sensor electrode.

* * * * *